United States Patent [19]
Kobayashi et al.

[11] Patent Number: 5,528,338
[45] Date of Patent: Jun. 18, 1996

[54] THERMAL DEVELOPMENT DEVICE

[75] Inventors: Atsushi Kobayashi; Takashi Suzuki, both of Suwa, Japan

[73] Assignees: Seiko Epson Corporation; Seiko Instruments Co., Ltd.; Fuji Photo Film Co., Ltd., all of Japan

[21] Appl. No.: 974,578

[22] PCT Filed: Jun. 16, 1992

[86] PCT No.: PCT/JP92/00767

§ 371 Date: Feb. 16, 1993

§ 102(e) Date: Feb. 16, 1993

[87] PCT Pub. No.: WO92/22854

PCT Pub. Date: Dec. 23, 1992

[30] Foreign Application Priority Data

Jun. 17, 1991 [JP] Japan .................................. 3-144588
Aug. 26, 1991 [JP] Japan .................................. 3-213433

[51] Int. Cl.⁶ .......................... G03B 27/32; G03B 27/52
[52] U.S. Cl. ........................... 355/27; 355/100; 355/200
[58] Field of Search .............................. 219/216; 118/60; 355/27, 200, 100, 202, 210, 245, 282, 285; 430/138

[56] References Cited

U.S. PATENT DOCUMENTS

| | | | |
|---|---|---|---|
| 3,246,400 | 4/1966 | Brown . | |
| 3,595,539 | 7/1971 | Kimura et al. | 432/228 |
| 3,884,623 | 5/1975 | Slack | 432/60 |
| 4,042,804 | 8/1977 | Moser | 219/216 |
| 4,660,964 | 4/1987 | Yoshikawa et al. | 219/216 X |
| 4,665,303 | 5/1987 | Miyakawa et al. | 219/216 |
| 4,760,426 | 7/1988 | Taniguchi et al. | 355/27 |
| 4,819,032 | 4/1989 | Nagumo | 355/27 |
| 5,128,709 | 7/1992 | Nagumo et al. | 355/27 |
| 5,313,248 | 5/1994 | Mita et al. | 355/27 |

FOREIGN PATENT DOCUMENTS

| | | |
|---|---|---|
| 018788 | 11/1980 | European Pat. Off. . |
| 1355224 | 4/1963 | France . |
| 29372 | 6/1982 | Japan . |
| 75247 | 4/1984 | Japan . |
| 114580 | 8/1984 | Japan . |
| 164777 | 8/1985 | Japan . |
| 176074 | 9/1985 | Japan . |
| 147461 | 7/1987 | Japan . |
| 220248 | 9/1988 | Japan . |
| 200859 | 12/1988 | Japan . |
| 972406 | 10/1964 | United Kingdom . |

*Primary Examiner*—Sandra L. Brase

[57] ABSTRACT

This is an invention of a thermal development device that controls wrinkles generated due to thermal deformation of a photosensitive member while it thermally develops images. This device heats uniformly and is a thermal development device that prevents deterioration of image quality due to unevenness in concentration that is caused by wrinkles. On the surface of a thermal development device (40) heating cylinder (41, 241, 341, 441) are: periodic circular-arc-shaped peaks and valleys, projection-type peaks and valleys on both ends of the heating cylinder, a crown-shaped curvature, and a linear projection that is formed in the shape of a spiral. In addition, a nip roller (50) that engages the photosensitive member at the heating cylinder (541) in the region of an initial heating position is provided. Further, for the nip roller, the heating cylinder (541) release and engaged conditions can be selected.

15 Claims, 9 Drawing Sheets

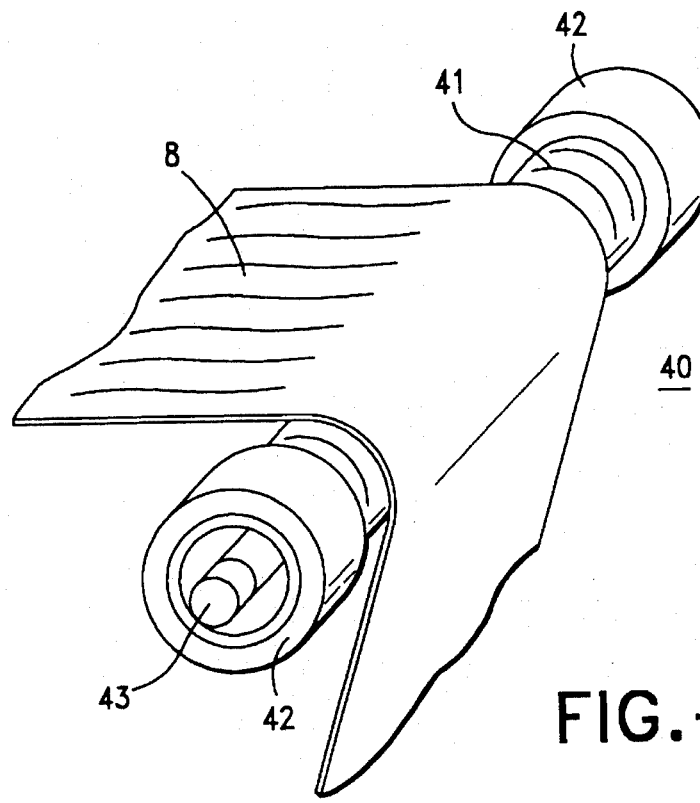
FIG.—4A
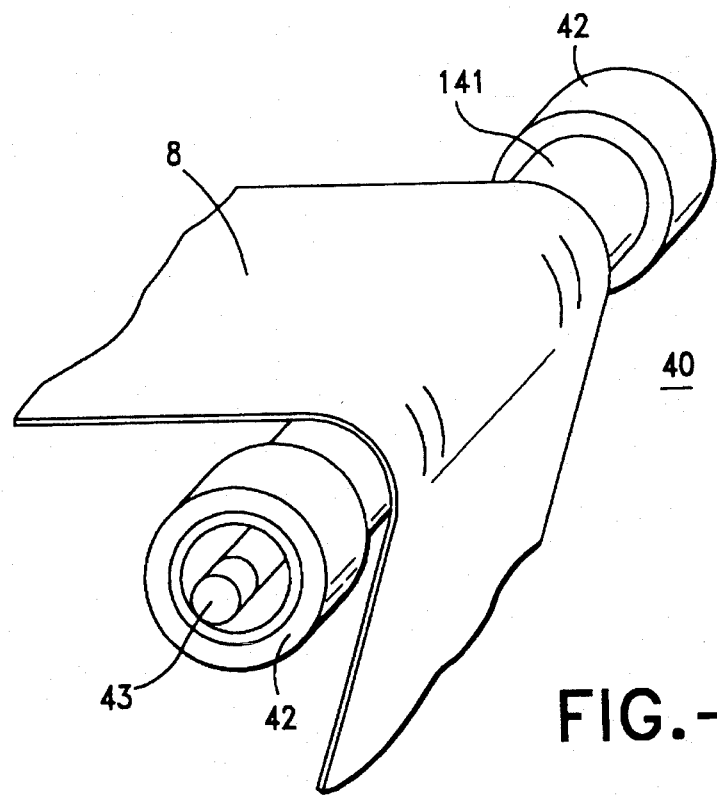
FIG.—4B

THERMAL DEVELOPMENT DEVICE

BACKGROUND OF THE INVENTION

1. Field of the Invention

This invention relates generally to a thermal development device for image forming mechanisms that use a thermal development photosensitive member that produces images for mechanisms such as copiers, printers, and facsimile machines. In particular, it concerns a method of reducing wrinkling in the aforesaid thermal development photosensitive member.

2. Related Technical Art

A large variety of image forming mechanisms and methods are known. Japanese Laid-Open Patent number 62-147461 is a prior-art example of an image forming mechanism that uses a thermal development photosensitive member. Based on this publication, major sections, such as an exposure section, a thermal development section, and a pressure transfer section, are formed into one integrated unit inside the mechanism. Image formation takes place using steps such as those that follow.

First, a roller-shaped transfer-type thermal development photosensitive member is cut to a designated length. After this, image exposure takes place to form a latent image. Next, thermal development takes place using a heating cylinder. After this, the photosensitive member and image-receiving paper are placed together and pressure transfer takes place using pressure rollers. The photosensitive member is discharged to a photosensitive member disposal section through a separation mechanism. The image-receiving paper passes through a fixing mechanism and is discharged to a tray through the separation mechanism.

Among the elements listed above for thermal development, a part of a heating cylinder peripheral surface is rotated by using an endless belt. During that time, thermal development occurs by placing the photosensitive member between the heating cylinder and endless belt moving it. In addition, the endless belt is always rotating the heating cylinder peripheral surface.

In addition to the exemplary prior art endless belt system, there are also configurations in which the photosensitive member is generally heated while in contact with a heating cylinder. The heating surface, in this case, is a smooth curved cylindrical surface, which is linear and has no unevenness when viewed along the paper width cross section. The photosensitive member is heated while the cylinder-shaped heating surface rotates. Or, the cylinder remains stationary and the photosensitive member is heated while its back makes sliding contact with the heating surface.

However, the technology of the prior art described above, has problems in that it cannot produce a stable output image concentration and cannot easily produce high-quality images with a uniform concentration.

First, using a thermal development method in which the photosensitive member is placed between the endless belt and heating cylinder, a phenomenon occurs in which the higher the surrounding temperature the lower the concentration, in spite of the fact that the heating cylinder is maintained at a constant temperature. Another problem is that the longer the elapsed time after power is turned on, the lower the concentration. This is due to changes in thermal development conditions caused by temperature fluctuations, which are caused by thermal conductance conditions from the surrounding temperature and the heating cylinder. Moreover, the endless belt itself has a complicated configuration. Always maintaining it at a constant temperature means using a very complex and costly mechanism.

However, a desired image concentration can be obtained using a simple configuration and at low cost if the thermal development device heats by making contact with one surface of the heating cylinder. The reason for this is that during thermal development the temperature of the photosensitive member can be accurately maintained by not allowing the photosensitive member to contact any component other than the heating cylinder. The temperature of the heating cylinder can be appropriately controlled.

However, using the method described, sometimes unintended concentration unevenness will appear in the images. That is, in general, it is often the case that the photosensitive member is made of a resin film, such as polyethylene terephthalate, or that it uses paper as a base material. With these, major thermal transformations (expansion or shrinking) take place due to the heating. As a consequence, the photosensitive member gradually wrinkles beginning with the area that makes contact with the heating surface. The wrinkled area rises and is inadequately heated. This results in lack of uniform developing, which causes concentration unevenness in the image and wrinkled paper due to pressure transfer. These greatly deteriorate the image quality.

This invention takes these conditions into consideration and resolves the problems described above. Its objective is to offer a highly reliable thermal development device for image forming mechanisms that allows high-quality images to be obtained simply and at low cost by means of stable and uniform heating of the photosensitive member.

SUMMARY OF THE INVENTION

According to this invention, a thermal development device is characterized by having a rough heating surface or a curved heating surface in relation to a photosensitive member's direction of travel, and in a vertical direction. It is also characterized by using linear projections on the heating surface.

In addition, when the inventors of this invention thoroughly studied the cause of the unevenness in concentration described above, which resulted from wrinkling of the photosensitive member, they also discovered that another cause was an instability of the initial contact position for the photosensitive member heating area. As a result, the width of the photosensitive member varies between locations where contact is made with the heated area of the thermal development device, and locations that have not reached the heated area and are not yet heated. When this happens, the width of the photosensitive member changes suddenly at the initial contact position in the heated area of the thermal development device, a boundary position. As a result, the photosensitive member which is floating in air before the heated area, becomes wavy. When the wavy photosensitive member makes contact with the heated area, which is cylindrical in shape, the initial contact position varies between the peaks and valleys of the waves. This creates a variance in heating time. Unevenness in concentration is created because unevenness is created by the degree of thermal development. A more severe case occurs when the wave-forming of the photosensitive member progresses into the heating section, creating areas where no contact is made and no developing takes place, significantly deteriorating image quality.

For this reason, another configuration for the thermal development device of this invention is a system that heats by making contact with parts of the surface of the photosensitive element, which is mainly the photosensitive member. It features a photosensitive member pinch means that pinches the aforesaid photosensitive member between the aforesaid heating areas in the initial heating position region.

It is especially desirable that:
(1) The aforesaid photosensitive member engagement means is an elastic cylinder.
(2) The aforesaid photosensitive member engagement means applies pressure to the aforesaid heating areas with a maximum surface pressure of 5 kilogram per square centimeter or less.

In addition, this system is also characterized by a photosensitive member engagement means that actually engages the aforesaid photosensitive member between the aforesaid heating surfaces at a relative speed of zero at the initial heating position. In this particular case, a hard roller type photosensitive member engagement means is desired.

This system is further characterized by a photosensitive member engagement means that engages the aforesaid photosensitive member on a time-selective basis between the aforesaid heating surfaces at the initial heating position.

Also desired are:
(1) That the aforesaid photosensitive member engagement means does not engage the aforesaid photosensitive member when the aforesaid photosensitive member is not developing.
(2) That when operational malfunction is detected in image forming steps by at least one detection mechanism which detects a designated operation of an image forming step, the aforesaid photosensitive member engagement means does not engage the aforesaid photosensitive member.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 4(a) and 4(b) are perspective views of wrinkling conditions for this invention and that of the prior art.

DESCRIPTION OF THE PREFERRED EMBODIMENTS

Figure 1:
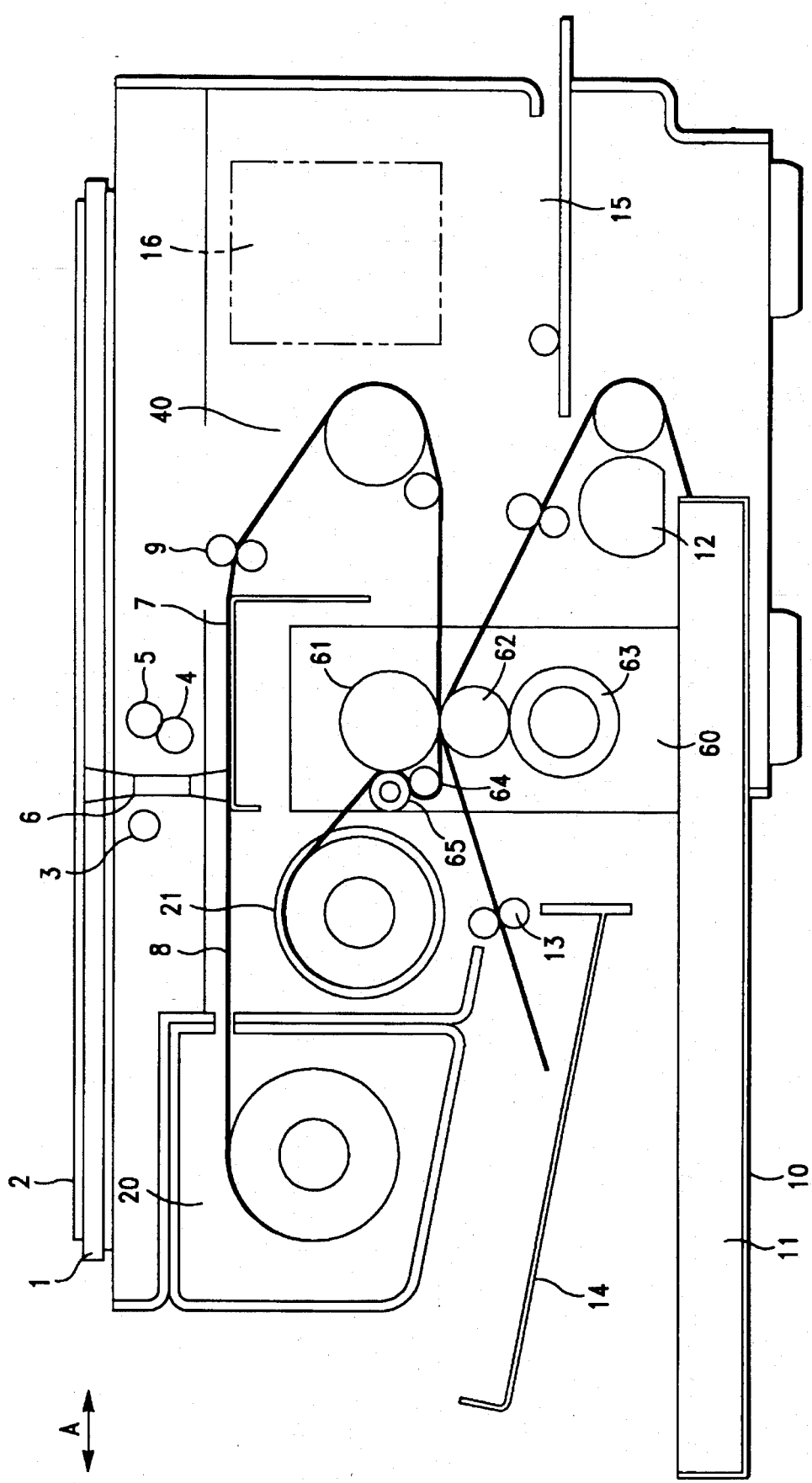
FIG. 1 is a front cross section of one example of a copier that uses the thermal development device of this invention.

The thermal development device of this invention is described in detail below according to the embodiments. FIG. 1 shows a front cross section of one example of an analog copier that uses the thermal development device of this invention. The operation of this machine is described first.

The machine is configured so that a document 2 is placed on a document table 1, which is such that it can move in the directions of arrow A in the drawing. Light beams that are emitted from light sources, a red lamp 3, a green lamp 4, and a blue lamp 5, illuminate document 2. At the same time, light reflected from document 2 passes through a lens 6 to form an image on a photosensitive member 8, which travels over an exposure table 7. This forms what is called a scanning exposure system.

After a latent image is formed on exposure table 7, photosensitive member 8 passes a travel roller 9 and is thermally developed by a thermal development device 40. Photosensitive member 8 is in the form of a continuous sheet that is fed from a cartridge 20, and cartridge 20 contains unexposed photosensitive member 8. A cut-sheet-shaped transfer member 11, which is contained in a paper supply tray 10, is supplied by a paper feed mechanism 12. Cut-sheet-shaped transfer member 11 is placed on top of photosensitive member 8 in the area where the image is formed. The image is pressure transferred by a pressure transfer mechanism 60 of the roller pressure system. The pressure section of pressure transfer mechanism 60 is composed of three rollers, an upper roller 61, a middle roller 62, and a lower roller 63. Pressure transfer takes place between upper roller 61 and middle roller 62.

After this, transfer member 11 is separated from photosensitive member 8 using a separation roller 64 and is discharged to a discharge tray 14 using a travel roller 13. However, photosensitive member 8 is wound up on a wind-up shaft 21 using a pinch roller 65, which expedites the travel and separation of photosensitive member 8. Number 15 represents a manual paper supply inlet. Number 16 represents a gas filter for removing gas produced inside of the machine.

Photosensitive member 8, as used in this embodiment, is like a photosensitive member with the thermal development properties described in Japanese Laid-Open Patent number 61-278849. In this embodiment, a 30-micron thick polyethylene terephthalate (PET) film is used as a base. Photosensitive micro-capsules that contain a photosensitive material and pigment are applied to this film in several distributed applications. The thermal expansion coefficient of the PET material just described is from 0.005% to 0.02% per degree centigrade. However, this can be adjusted through the residual strain generated in the manufacturing process and an annealing process for removing the strain.

Figure 2:
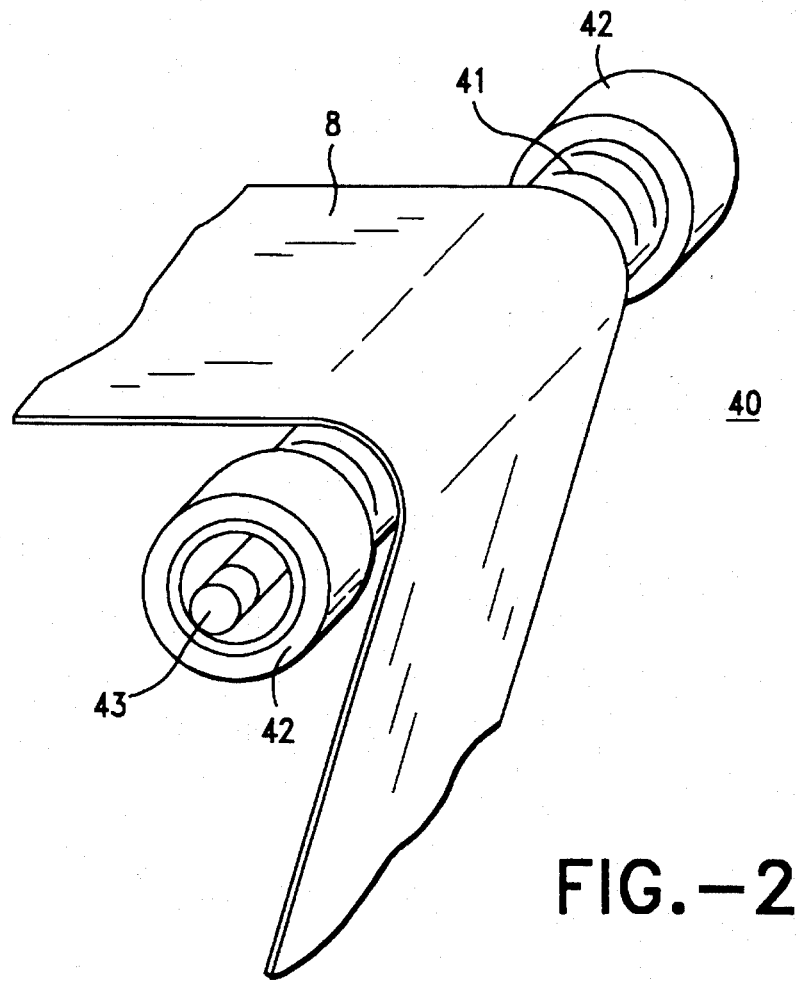
FIG. 2 is a perspective view of a first embodiment of the thermal development device of this invention.

The thermal development device, which is a feature of this invention, is described next. FIG. 2 shows a perspective view of a first embodiment of a thermal development device 40 in the image forming mechanism shown in FIG. 1. It is characterized by a not flat heating surface.

In the drawing, a designated amount of photosensitive member 8 is wound around a heating cylinder 41. The heating cylinder has a circumferential heating surface. In addition, it is heated by contact with the surface where micro-capsules have not been applied, while applying tension and being moved. Heating cylinder 41 is formed of hollow aluminum. Both ends of it are supported by bearings 42 attached to a frame, which is not illustrated, so as to allow rotation. As a consequence, heating cylinder 41 rotates along with the motion of photosensitive member 8. Heating cylinder 41 also has a halogen lamp heater 43 inside. The amount of heat is controlled appropriately by a control mechanism (not illustrated) so that the circumferential heating surface remains constant at a designated temperature between 120° C. and 160° C.

Figure 3:
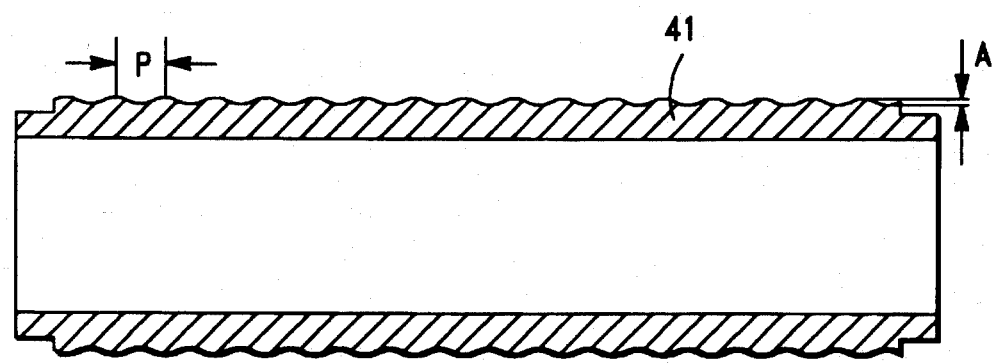
FIG. 3 is a cross section of the heating cylinder of FIG. 2.

FIG. 3 shows a cross-section of heating cylinder 41. Circular-arc-shaped peaks and valleys having a pitch of P=20 mm and an amplitude of a=0.2 mm have been periodically placed on the cylindrical surface. As for the method of producing the peaks and valleys, it is desirable to place them so that they are slightly longer than the width of the photosensitive member after the curvature length has thermally expanded. This length goes along the peaks and valleys on the cross section in the cylindrical axis direction. Experiments have confirmed that if the curvature length along the peaks and valleys is equal to or shorter than the photosensitive member after thermal expansion, wrinkling often occurs when photosensitive member 8 is heated. Experiments have also confirmed that if the curvature length is too long, it rises upward at the valleys, causing inappropriate heating.

The perspective drawings of FIGS. 4(a) and 4(b) show wrinkle generating conditions when thermal development takes place using thermal development device 40 of this embodiment and smooth heating cylinder 141 described in the prior art. In contrast to the wrinkle generation on a smooth heating cylinder 141 of the prior art, photosensitive member 8 in thermal development device 40 (FIG. 4 (a)) of this invention is wavy in areas other than heating cylinder 41. That is, a situation in which wrinkles resolve the problem of excess length in the horizontally extended photosensitive member 8 is resolved by moving along the peaks and valleys. Moreover, by providing slightly more length to the peaks and valleys a force is provided that pulls photosensitive member 8 more inward than in the unheated area, and provides stable control of the wrinkles.

Figure 5:
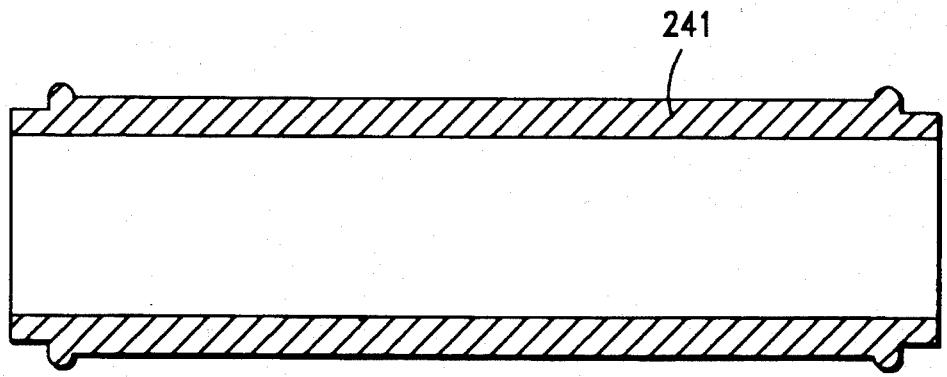
FIGS. 5 and 6 show variations of the first embodiment as shown in FIG. 2.

A cross sectional drawing of heating cylinder 241 in FIG. 5 is used next to describe a variation of the first embodiment of the thermal development device shown in FIG. 2. Except for using differently shaped peaks and valleys on heating cylinder 241, the composition of this embodiment is the same as the one just described. In the case this embodiment of heating cylinder 241, the area in the image region of photosensitive member 8, which makes contact with heating cylinder 241, is smooth. In addition, projections are provided on either end outside of the image region. In the previously described embodiment, small wrinkles may be generated by the conditions of tension, etc., because there are peaks and valleys within the image area. However, in this embodiment, the heating cylinder within the image area is smooth. Therefore, there is no deterioration in image quality due to the generation of small wrinkles.

Figure 6:
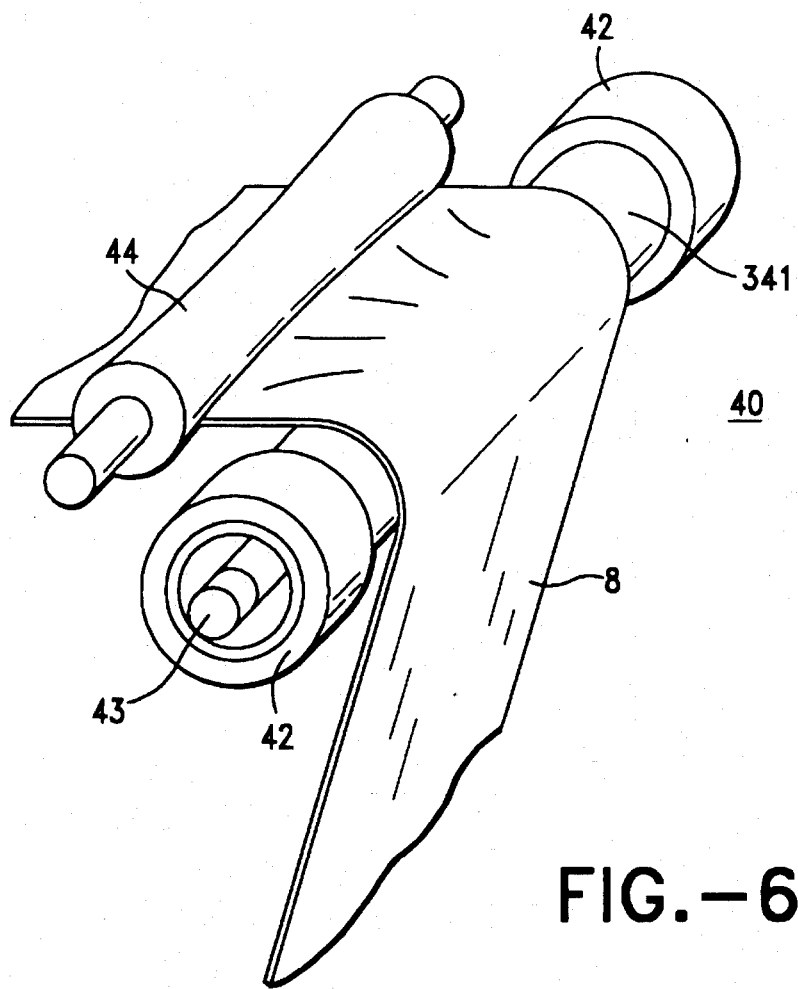

Still another variation of the first embodiment is in FIG. 6, which shows a perspective view of the embodiment. The diameter of a center section of a heating cylinder 341 uses a so-called crown shape, which has a larger diameter than the diameter of both ends. Having from 0.5 mm to 4 mm difference between the diameter of the center section and that of both ends is desired. If it is smaller than 0.5 mm, wrinkles will often form on photosensitive member 8, just as occurred in the prior art. Experiment has confirmed that a difference larger than 4 mm may form wrinkles of a different shape. A path-length correction roller 44, which is supported by beatings (not illustrated) on both ends to allow rotation, has a so-called reverse crown shape. In this case, the diameter of both ends is larger than that of a center section. Combining both rollers eliminates uniformity of tension by making the path length constant in the direction of travel for photosensitive member 8. Except for heating cylinder 341 and path-length correction roller 44, this configuration is the same as that described in the embodiment above. The thermal development device of this embodiment does not cause small wrinkles in the image region. In contrast to the embodiment shown in FIG. 5, in which the width of the photosensitive member must be wider than that of the image region to a certain degree, this one requires only a slightly wider width.

In the embodiment shown in FIG. 3, distortion is generated in the valley and peak areas because the path length changes in the direction of travel for photosensitive member 8. This may appear as unevenness in concentration. However, in such a case, this can be avoided by forming the peaks and valleys in a spiral configuration.

All of the embodiments described above are configurations in which a heating cylinder receives a static friction force through the force of motion for photosensitive member 8 and is rotated. However, it has been confirmed that the same results can be obtained in a configuration where photosensitive member 8 slides on the heated surface while the heating cylinder is static. In this case, everything does not necessarily have to be completely cylindrical in shape. A thermal development device with a heating surface that in part uses circular arcs is also acceptable.

Figure 7:
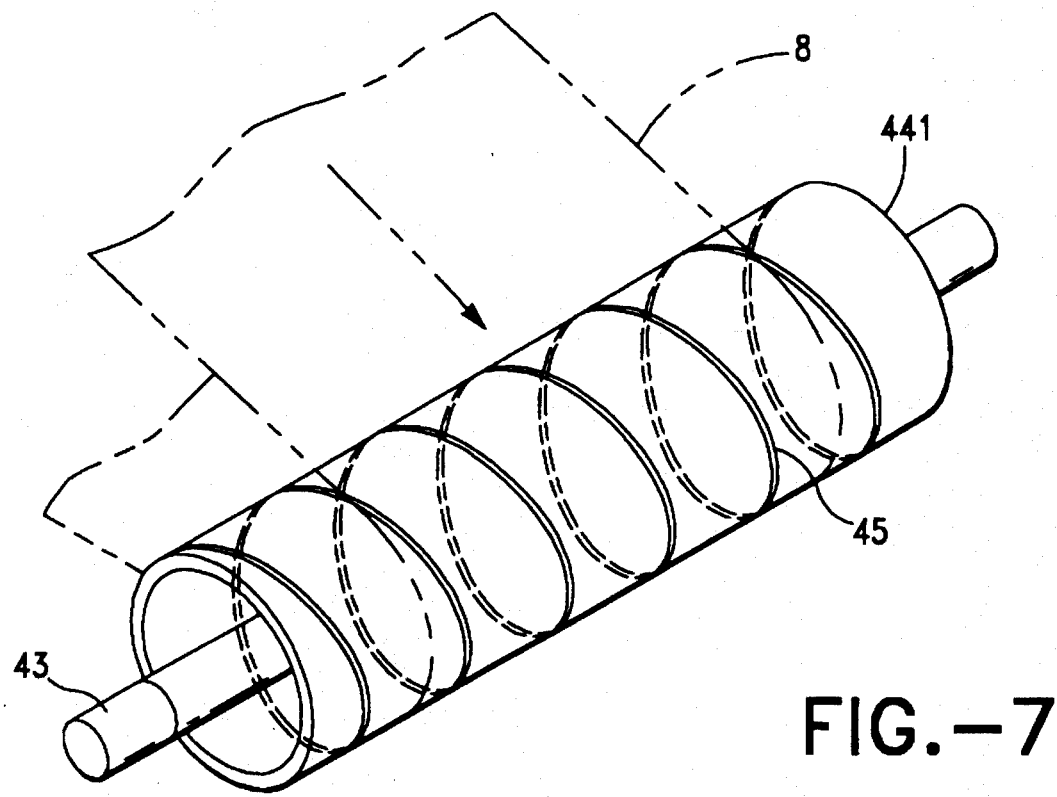
FIG. 7 is a perspective view of a second embodiment of the thermal development device of this invention.

A second embodiment of the thermal development device of this invention is described next. FIG. 7 shows a perspective view of a second embodiment of thermal development device 40 in the image forming mechanism of FIG. 1. In order to create peaks and valleys on the fixed heating cylinder, wire has been wound around it.

In the drawing, thermal development device 40 is composed of a heating cylinder 441, a wire 45 wound in a spiral fashion around heating cylinder 441, and a halogen lamp heater 43, which is for heating. Heating cylinder 441 is fixed in position and does not rotate. Photosensitive member 8 is heated while it slides across heating cylinder 441. In this embodiment, the diameter of heating cylinder 441 is 30 mm. Wire 45 is made of stainless steel with a diameter of 0.3 mm.

Wire 45 is a feature of this embodiment. Even if photosensitive member 8 expands thermally perpendicular to its direction of movement, that is, in the lengthwise direction of heating cylinder 441, the part that rolls over wire 45 absorbs that expansion. This allows wrinkle generation to be suppressed. In addition, because the wire is wound in a spiral, the part of photosensitive member 8 that crosses wire 45 changes with another part, and every part of photosensitive member 8 is thermally developed in a uniform manner. Optimal conditions can be gained by changing wire 45 thickness and the number of windings by using photosensitive member 8 base material properties and heating temperature.

Figure 8:
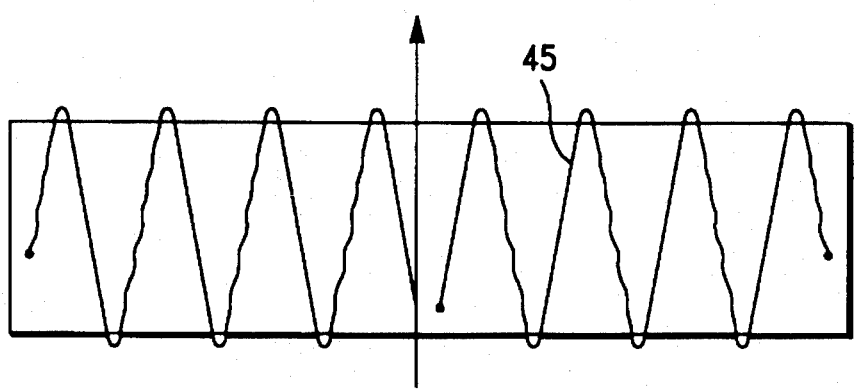
FIG. 8 is a top view of a variation of the embodiment shown in FIG. 7.

FIG. 8 shows a variation of the embodiment in FIG. 7 which is basically the same as the embodiment of FIG. 7. However, the feature here is that the wire is wound from the center and spreads in the direction (the expansion direction) of the outside ends. This is in contrast to photosensitive member 8 moving in the direction of the arrow. In this manner, even if wrinkles start to appear on photosensitive member 8, they will be naturally pulled to the outside and eliminated. In addition, it is possible to prevent slanted movement of photosensitive member 8 because it has left and right symmetry.

Figure 9:
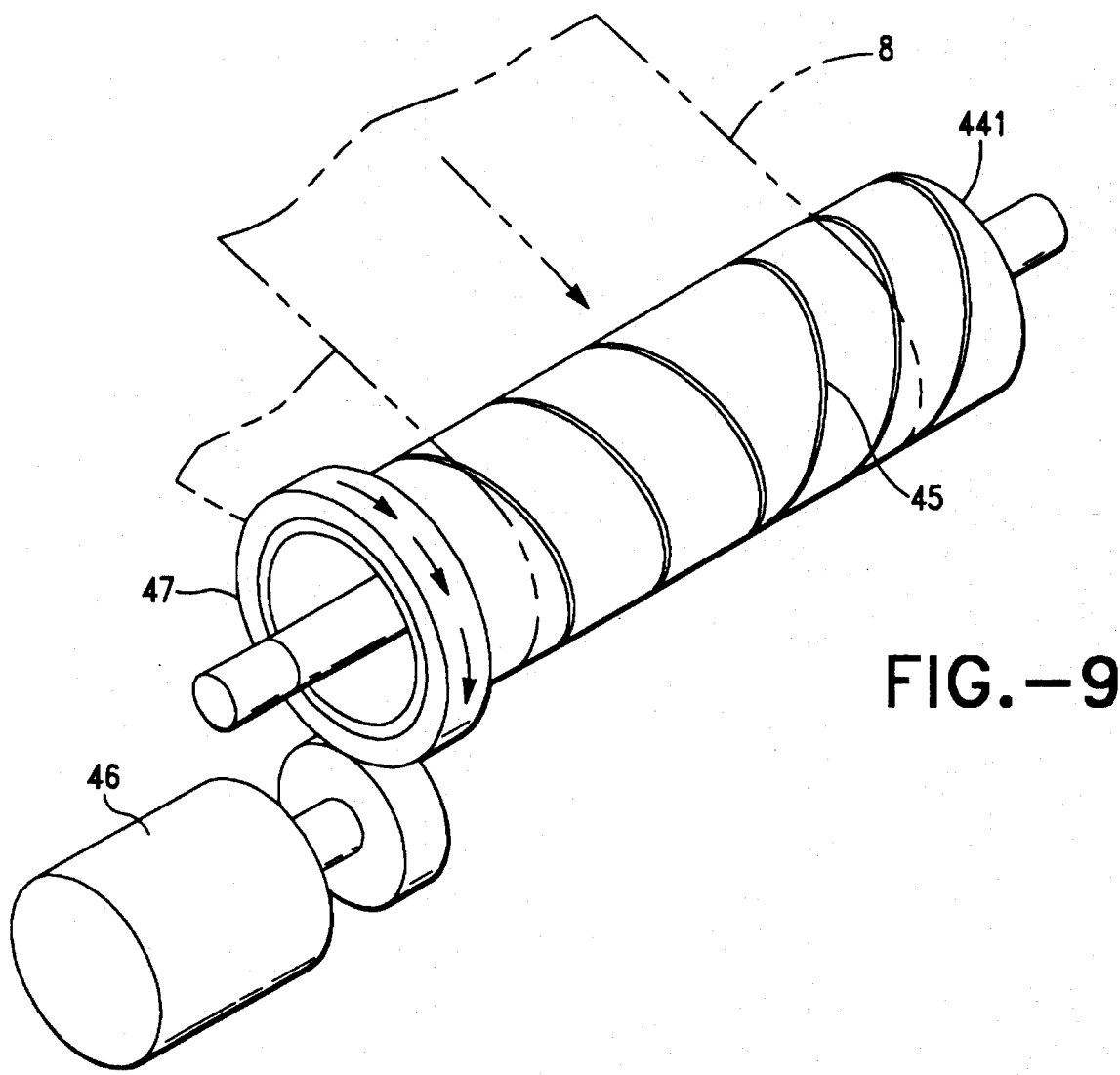
FIG. 9 is exemplary applications of the embodiments of FIG. 7 or FIG. 8.

FIG. 9 shows an exemplary application of the embodiments of FIGS. 7 or 8. The composition of FIG. 9 is the same as that shown in FIGS. 7 and 8. However, in this embodiment, heating cylinder 441 is rotated by a drive motor 46 through gears 47. The direction of rotation is the same as the direction in which photosensitive member 8 travels. However, the heating cylinder 441 rotating speed is peripheral speed, which is faster than the speed of travel for photosensitive member 8. This functions to spread photosensitive member 8 toward the outside. Of course, the direction of the wire can be reversed so that it rotates in a direction opposite to the direction of travel for photosensitive member 8. Using the configuration of this embodiment, the development unevenness caused by wire 45 can be avoided because even if photosensitive member 8 winds around heating cylinder 441 at a small angle, the total area of photosensitive member 8 has an equal amount of time in contact with wire 45.

Figure 10:
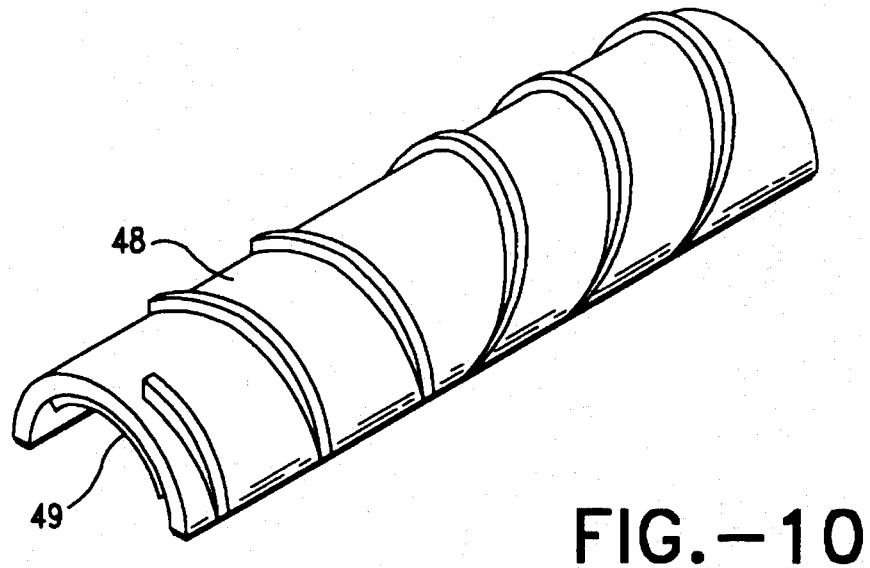
FIG. 10 is another variation of the embodiments of FIG. 7 or FIG. 8.

FIG. 10 shows another variation of the embodiments of FIGS. 7 and 8. To gain the same results as those described above, it does not use a wire and a cylinder as described above. It is made as a single unit by aluminum casting or forging, in the form of a heating plate 48. In addition, in this embodiment, there is no halogen lamp. It uses a surface heating element as a heat source. By forming this as a single unit, durability is in effect improved and some manufacturing costs are eliminated. In addition, more uniform development is possible because of an increase in the degree of freedom for the shape.

Another method of suppressing the generation of wrinkles is described next. FIGS. 11 through 16 are drawings that describe this embodiment, a third embodiment. Differing from the first and second embodiments described above, its feature is in supporting the photosensitive member relative to the smooth heating surface.

Figure 11:
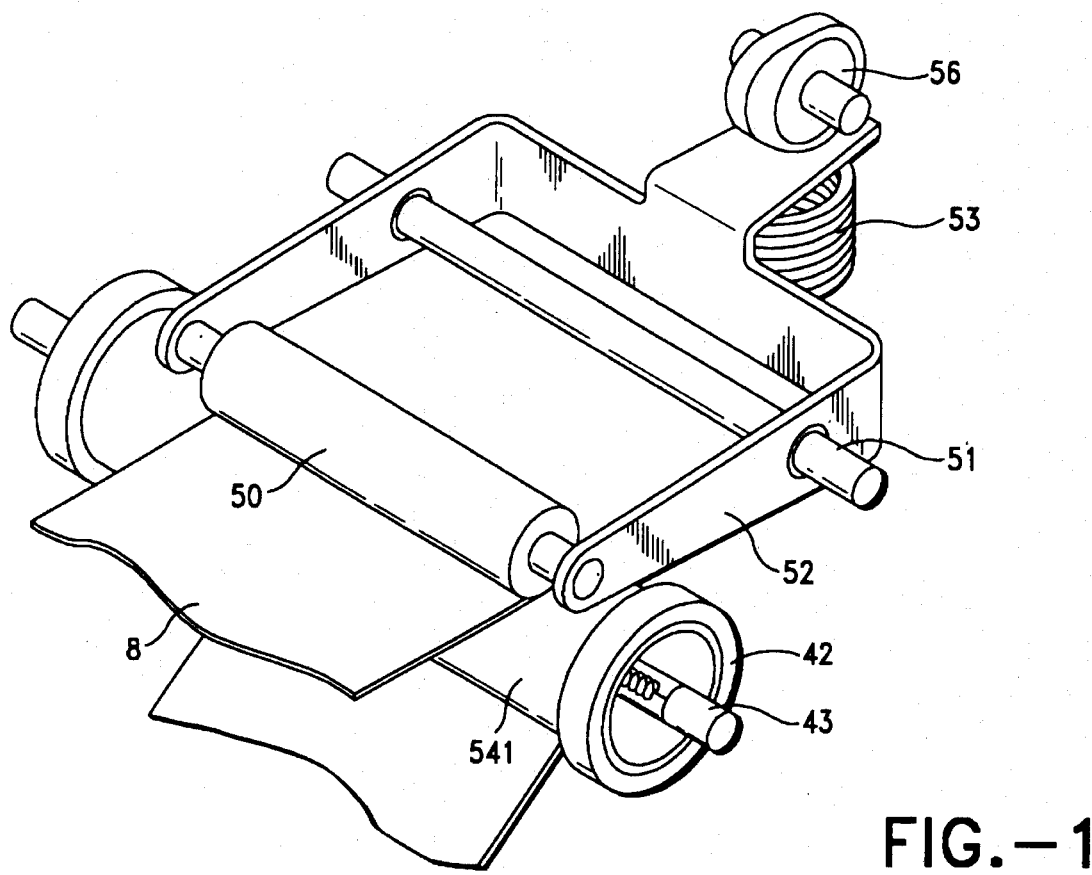
FIG. 11 is a perspective view of a third embodiment of the thermal development device of this invention.

FIG. 11 shows a perspective view of the third embodiment of the thermal development device 40 of the image forming mechanism of FIG. 1. In the drawing, photosensitive member 8 is pinched with a nip roller 50 and a heating cylinder 541 so that the side having the microcapsules makes contact with nip roller 50 at a heating cylinder 541 initial heating position. In addition, in areas other than the initial heating position, for each designated amount, photosensitive member 8 winds onto heating cylinder 541, which has a circumferential heating surface, so that the side without microcapsules makes contact. Photosensitive member 8 is heated by contact while traveling under tension. Heating cylinder 541 is supported on both ends by bearings 42 to make rotation possible. As a result, heating cylinder 541 is rotated by movement of photosensitive member 8. Moreover, heating cylinder 541 has a halogen lamp heater 43 inside, which controls the amount of heat so that the temperature of the circumferential heating surface is constant at a designated temperature of between 120° C. and 160° C.

Nip roller 50 is attached to a lever 52 that reciprocates and has a center at a rotating shaft 51 which is attached to a frame (not illustrated). This allows the nip roller to rotate. Lever 52 is forced down on heating cylinder 541 by a spring 53. Spring 53 is attached on one end to the frame (not illustrated) and on the other end to lever 52.

Figure 12:
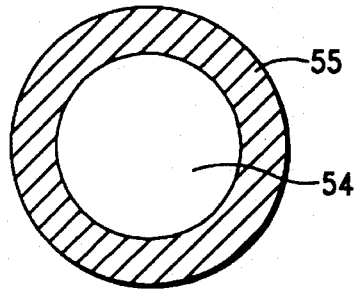
FIG. 12 is a cross section of the nip roller of FIG. 11.

The structure of nip roller 50 is described using the cross sectional drawing of FIG. 12. For the nip roller, an elastic material such as rubber or elastomer is placed around a metal core 54. From the perspective of thermal resistance for the nip roller elastic material, using a material such as silicon rubber, rubber fluoride, ethylene propylene rubber, epichlorohydrine rubber, or butyl rubber is desired. To prevent excess surface pressure on the surface of the photosensitive member, the hardness of the elastic material and with the force of the spring 53 must be considered. Based on experiments carried out by the inventors, if the maximum pressure applied to the photosensitive member exceeds five kilograms per square centimeter, blurring appears in low concentration areas of the image. This is believed to be caused by the destruction of micro-capsules before they are hardened. Micro-capsules are intended to harden and not transfer images.

The maximum surface pressure must always be held below a specified value across the entire width of photosensitive member 8. However, because the nip roller is an elastic roller, the conditions described above can be achieved without depending on the accuracy of the shapes for nip roller 50 and heating cylinder 541, and with little dependence on installation accuracy for both components. The reason for this is that irregularities in pressure due to tolerance are absorbed and made uniform by virtue of the elasticity. At a result, cost increases due to the need for more accuracy can be prevented.

Conditions for establishing a maximum surface pressure within the specified values for the elastic roller can be found by a relationship which is related to elastic roller contact, and expressed in equation 1.

$$P_{max} = P_L \cdot \sqrt{\frac{3E}{bD_a P_L}} \qquad \text{Eq. 1}$$

where:

$P_{max}$ is the maximum surface pressure.

$P_L$ is the wire thickness (total load/pressure width).

E is the elastic coefficient of the elastic material.

b is the thickness of the rubber.

$D_a$ is the actual diameter of the roller.

and $$\frac{1}{D_a} = \frac{1}{d_1} + \frac{1}{d_2}$$

where:

$d_1$ is the diameter of the nip roller.

$d_2$ is the diameter of the heating cylinder.

In this embodiment, the above conditions have been accomplished using a compressed rubber hardness of 80 (JIS A) with a linear pressure of 200 grams per centimeter.

Figure 13:
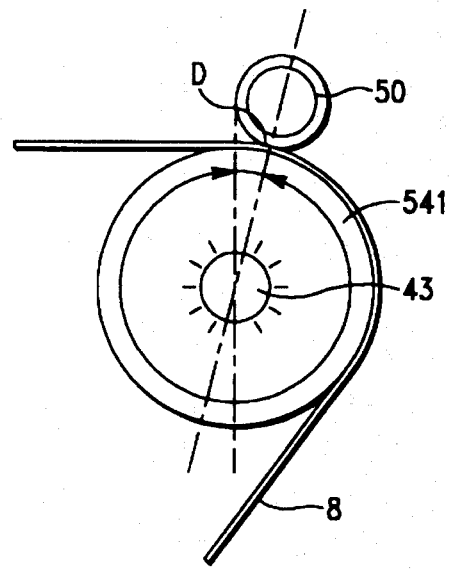
FIG. 13 is a cross section of the positional relationship between the nip roller and the heating cylinder.

The positioning of nip roller 50 is described next. FIG. 13 shows a cross section of the relationship between nip roller 50 and heating cylinder 541. In this invention, it is necessary to position nip roller 50 within the region of an initial heating position. However, based on experiments by the inventors, the generation of unevenness in concentration can be suppressed when the distance, D, between the initial heating position and the nip start position is D<5 mm. Of course, allowing photosensitive member 8 to contact nip roller 50 before heating cylinder 541 is acceptable.

By using the elastic roller as such a photosensitive member pinch means, this simple structure prevents concentration unevenness that is caused by waving of the photosensitive member at the initial heating position of thermal development. In addition, the blurring of low concentration areas is also prevented. Moreover, because the time in which the photosensitive member is in contact with nip roller 50 is short, the temperature of photosensitive member 8 cannot rise completely while contact is being made. As a consequence, the temperature rise of nip roller 50 itself is held to a certain set value. In this embodiment, the temperature is 60° C. lower than the temperature of heating cylinder 541. As a result, thermal development is always maintained in a condition that allows it to start after passing nip roller 50 which allows stable images to be obtained.

A variation of the third embodiment shown in FIG. 11 is described next using the perspective drawing shown in FIG. 14. This configuration is basically the same as that shown in FIG. 11. However, a feature of this embodiment is that nip roller 150 is made from a hard material, such as metal, resin, or hardened rubber.

In the case of a hard roller, the roller itself remains almost unchanged even when photosensitive member 8 is placed under pressure through heating cylinder 541. As a result, the peripheral speed at the point of contact between photosensitive member 8 and nip roller 150, which rotates by being driven by movement of photosensitive member 8, is almost the same as the speed of travel for photosensitive member 8.

When there is a clear existence of relative speed at the point of contact between photosensitive member 8 and the photosensitive member engagement means, the photosensitive member 8 surface with the micro-capsules becomes abraded, sometimes showing scratches in the image. In the case of a photosensitive transfer image forming mechanism that uses micro-capsules as described in this embodiment, when the surface of the photosensitive member is abraded, the micro-capsules are destroyed. They are destroyed by contact pressure that is very much smaller than the pressure applied in the vertical direction. In addition, ink is transferred from areas where the ink is supposed to be hardened and transfer is not supposed to take place. For example, if the nip roller is fixed in place so that it cannot rotate, fine black lines will appear in images even if a small amount of surface pressure is applied to nip roller 150. In addition, even if the nip roller can rotate, the surface of the photosensitive element may be damaged if the roller is deformed due to pressure. The reason for this is that the shape of the roller changes in the cross section direction when placed under pressure. However, during the period beginning with placement of photosensitive member 8 in the nip area and until the area of surface pressure has passed and photosensitive member 8 leaves the nip area, the speed at the surface of the roller will not be constant because the radius of the contact point changes due to deformation. This happens regardless of the fact that nip roller 150 rotates at a constant speed. As a result, a relative speed appears between the surface of nip roller 150 and photosensitive member 8. The surface of photosensitive member 8 is slightly abraded and micro-capsules are destroyed. There is no concern that this type of problem will arise if nip roller 150 is composed of a hard roller.

When hard rubber is used on nip roller 150, there are no scratches on the image from surface abrasion of photosensitive member 8 as described above. However, if the force on heating cylinder 541 is too great, the surface pressure will be too high, destroying the micro-capsules and creating blurring in low concentration areas of the image. Based on experiments of the inventors, blurring appeared when nip roller 150 was placed under linear pressure over 100 grams per centimeter. A spring 53 needs to be decided upon so that this range is not exceeded.

The operation of the third embodiment, which was already described above, is described next. This embodiment features a series of operations for the nip roller image formation in particular. It is described by once again returning to FIG. 11. In the drawing, a cam 56, which is driven to rotate by a motor (not illustrated) can lift lever 52 in the direction opposite to that in which it is forced by spring 53. This allows a nip roller 50 configuration that allows separation from the heating roller.

Figure 15A:
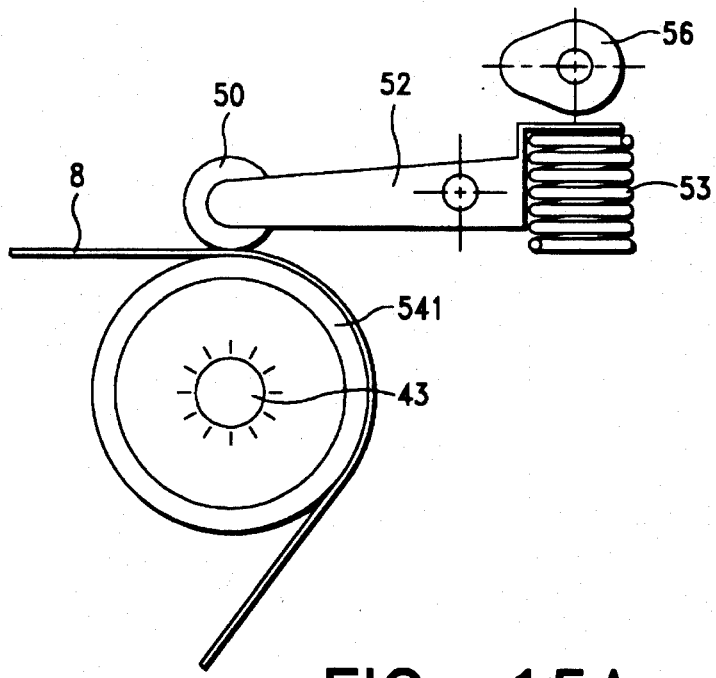
FIGS. 15(a) and 15(b) are cross sectional drawings for explaining the operation of the nip roller.
Figure 15B:
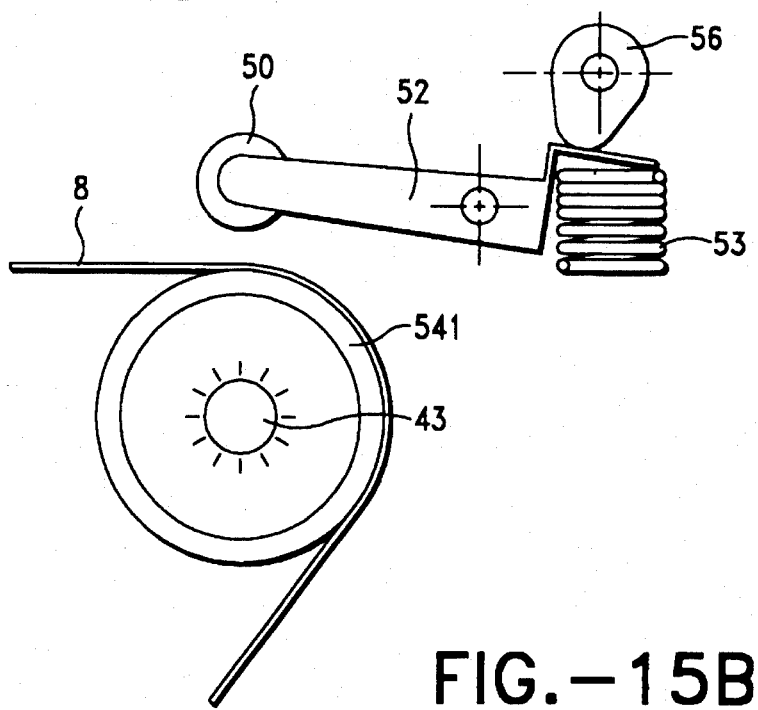

The operation of nip roller 50 is described next using the cross sectional drawings of FIG. 15. FIG. 15(*a*) shows photosensitive member 8 engaged with nip roller 50, engaged condition, and heating cylinder 541. Cam 56 is in a position where it makes no contact with lever 52, and compression force for nip roller 50 is generated by spring 53. FIG. 15(*b*) shows photosensitive member 8 not engaged with nip roller 50, released condition, and heating cylinder 541. Cam 56 overcomes the force of spring 53 and lifts lever 52 upward. Nip roller 50 does not make contact with photosensitive member 8.

In this embodiment, when a copy operation starts, the document image begins to be formed as a latent image on photosensitive member 8. In a standby condition, nip roller 50, which is in a released condition, enters an engaged condition due to cam 56 rotating until it arrives at a designated position before the image region arrives at heating cylinder 541. When carrying out a copy operation for only one image, the movement of photosensitive member 8 continues until the end of the image region has passed pressure transfer mechanism 60. Thus, the engaged condition is maintained during that period. A shift to a release condition occurs after this. When consecutive copy operations take place, the engaged condition continues until the final image region has finished passing pressure transfer mechanism 60.

By using a photosensitive member engagement means in this manner, unevenness in concentration caused by waving of photosensitive member 8 at the initial thermal development heating position can be prevented using a simple configuration. Moreover, during the period photosensitive member 8 is moving, photosensitive member 8 makes contact with nip roller 50 for a short period of time. Therefore, during the time that contact is being made, the temperature of photosensitive member 8 cannot rise completely. During the period when photosensitive member 8 is static, nip roller 50 is in a released condition. Therefore, there is no heat conductance from heating cylinder 541. As a result, the temperature rise of nip roller 50 itself is held to a certain set value. In this embodiment, this temperature is 80° C. lower than the temperature of heating cylinder 541. As a result, for the thermal development reaction, the condition in which the thermal development reaction starts after passing nip roller 50, is always maintained and allows stable images to be obtained.

Figure 16:
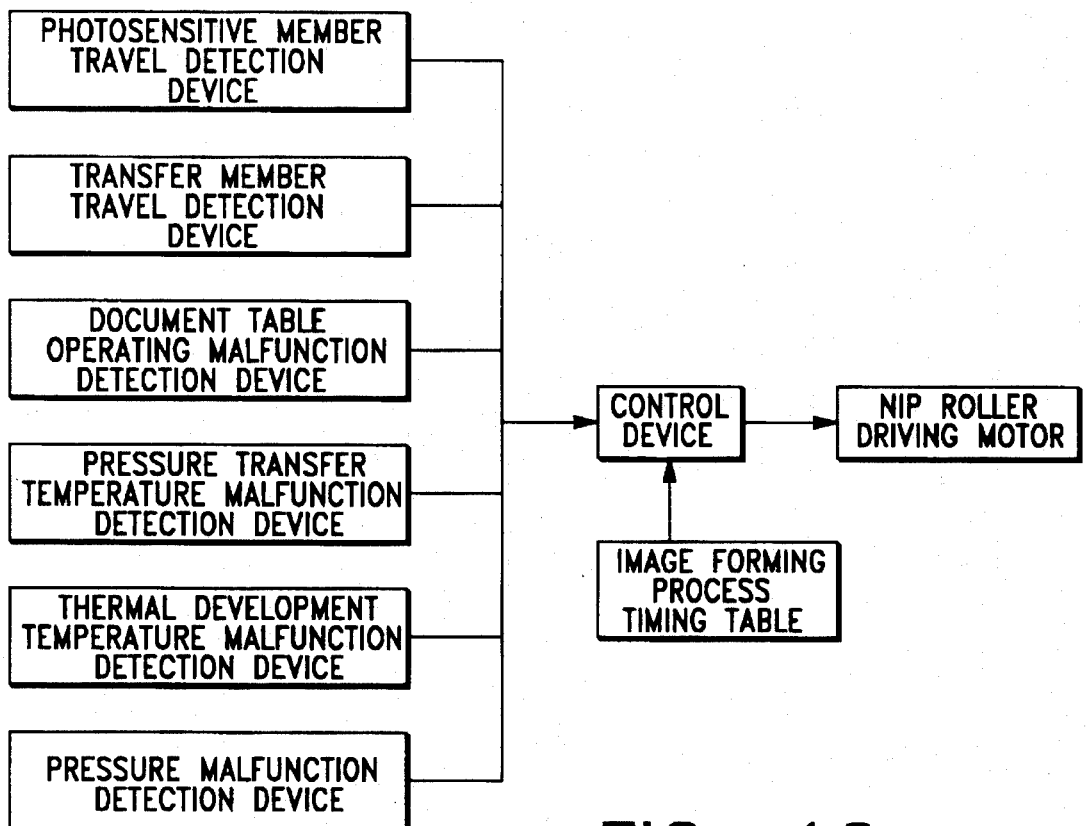
FIG. 16 is a block diagram showing a malfunction detection system for the image forming mechanism.

A description of nip roller 50 operations for when a malfunction occurs in the image forming step is described next. FIG. 16 is a block diagram of an image forming operation malfunction detection system for the image forming mechanism of this embodiment, which is shown in FIG. 1. Among malfunction detection sensors are photosensitive member travel detection, transfer member travel detection, document table operating malfunction detection, thermal development temperature malfunction detection, pressure transfer temperature malfunction detection and pressure malfunction detection. A description of each detection operation and nip roller 50 operation is given.

The photosensitive member travel detector detects whether or not the photosensitive member is moving accurately. This is detected by a type of encoder that senses an axial speed of rotation for cartridge 20 by means of a rotating slit disk using an opto-electric sensor. In other words, when the slit window area on the disk comes to the opto-electric sensor, light from a light emitting element is shut off by the disk and does not reach the light sensing element. As a result, as the rotating slit disk rotates, on and off signals from the light sensing element are continuously output. The speed of travel for photosensitive member 8 is detected by that frequency. If the detected speed of photosensitive member 8 exceeds a specified range, normal images cannot be obtained, whether it is due to photosensitive member 8 being crammed inside of the image forming mechanism or due to a cycle being off, etc. The result is that nip roller 50 is placed in the released condition.

A lever placed in the path of travel for the transfer member is knocked down by the passage of transfer member 11. The transfer member travel detector detects whether or not transfer member 11 is in the travel path by obstructing a light for an optical sensor on one end of the lever. At a specified time during the copy operation, detection takes place to determine if transfer member 11 has reached or already passed the transfer member travel detection position. If the signal differs from an anticipated signal, nip roller 50 is placed in the released condition because a problem such as a paper jam might have occurred.

The document table malfunction detector determines if a lever placed in the path of motion for document table 1 has been knocked down. In the same manner as the transfer member travel detector, detection of whether or not the document table exists takes place. At a specified time during the copy operation, detection takes place to determine if document table 1 has reached or already passed the document table detection position. If the signal differs from an anticipated signal, nip roller 50 is placed in the released condition because if the correct movement of the document table cannot take place, normal images cannot be obtained.

For the thermal development temperature malfunction and pressure transfer temperature malfunction detectors, if the temperatures detected by thermistors, which are able to slide on heating cylinder 541 and the upper roller 61, have exceeded a specified range, nip roller 50 is placed in the released condition because normal images cannot be obtained.

The pressure malfunction detector detects the position of the middle roller of the pressure transfer mechanism that selects either pressure and release using a detector that is the same as that for the document table malfunction detector. It detects whether or not the condition is that of pressure or release. When transfer member 11 applies pressure at a time that is not in the pressure transfer section or when transfer member 11 does not apply pressure at a time that is in the pressure transfer section, nip roller 50 is released.

Performing the above malfunction processing operations prevents nip roller 50 from being left in the engaged condition when photosensitive member 8 continues to be in a stopped condition. This prevents nip roller 50 from becoming too hot and influencing the thermal development condition of the next copy operation, prevents contamination on nip roller 50, or in a severe case, prevents the nip roller from sticking to photosensitive member 8. In addition, when photosensitive member 8 is jammed, it allows an easy resolution.

Figure 14:
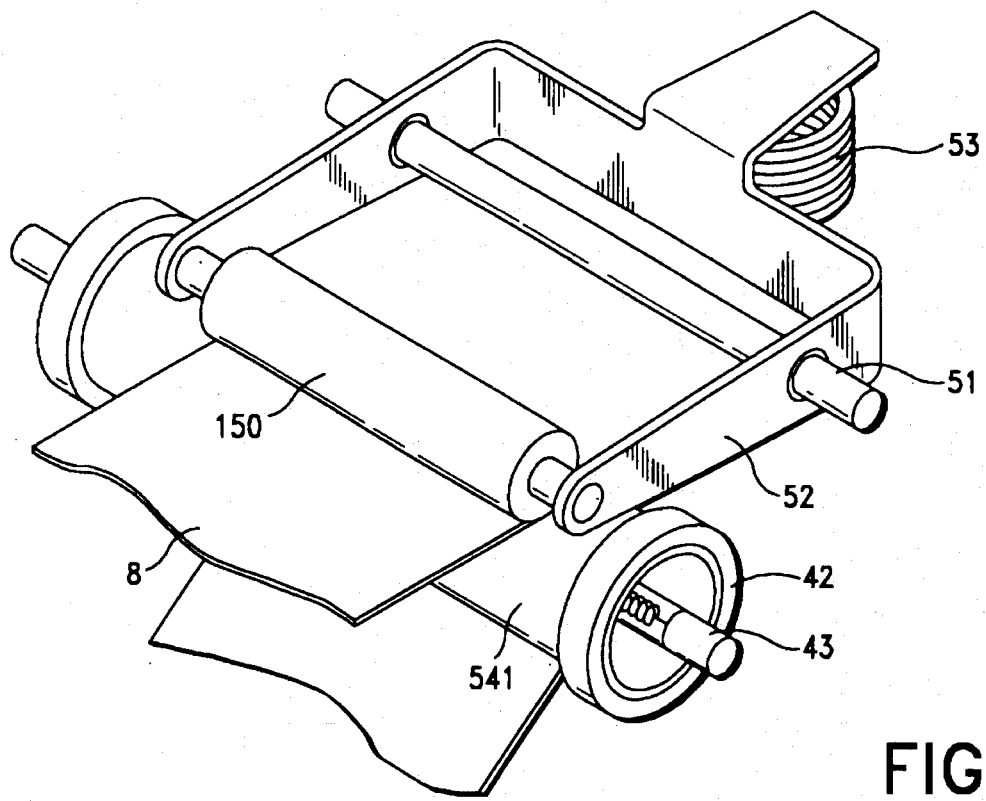
FIG. 14 is a perspective view of a variation of the embodiment in FIG. 11.

The above operations can be applied in the same manner to FIG. 14, which is a variation of FIG. 11.

In the third embodiment described above, the configuration is such that all heating surfaces receive static friction forces from movement of photosensitive member 8 and are caused to rotate. However, it has been confirmed that the same effect can be obtained for a configuration in which heat is applied while the heating surface is static and the photosensitive member slides across the heating surface. In this case, a totally cylindrical shape is not necessarily required. The thermal development device may also have a heating surface that employs a part of a circular arc.

This invention can be applied widely to a broad range of thermal development photosensitive materials. It is not limited to the photosensitive transfer type thermal development materials described in the embodiments.

In addition, a copier was used as an example in the description of the embodiments. However, the invention is not limited to this. It goes without saying that this invention can be applied to a broad range of image forming mechanisms, such as printers, facsimile machines, and electronic cameras.

POTENTIAL INDUSTRIAL USES

As described above, the thermal development device of this invention can be used in a broad range of areas as a processing mechanism for thermal development of photosensitive materials. Among them, it can be applied favorably to image forming mechanisms such as copiers (analog and digital), printers, facsimile machines, and electronic cameras.

In particular, an image output having controlled unevenness or concentration or controlled paper wrinkling can be obtained in a stable manner by absorbing thermal deformations of a thermal development photosensitive member. The result is that a highly reliable image forming mechanism having high quality and a high-level of mass production capability is obtained and at a low cost.

| Description of Numerical Designations | |
|---|---|
| 1 Document table | 46 Drive motor |
| 2 Document | 47 Gears |
| 3 Red lamp | 48 Heat plate |
| 4 Green lamp | 49 Surface heating element |
| 5 Blue lamp | 50 Nip roller |
| 6 Lens | 51 Rotating shaft |
| 7 Exposure table | 52 Lever |
| 8 Photosensitive member | 53 Spring |
| 9 Travel roller | 54 Core shaft |
| 10 Paper supply tray | 55 Elastic member |
| 11 Transfer member | 56 Cam |
| 12 Paper feed mechanism | 60 Pressure transfer mechanism |
| 13 Travel roller | |
| 14 Paper discharge tray | 61 Upper roller |
| 15 Manual paper supply inlet | 62 Middle roller |
| 16 Gas filter | 63 Lower roller |
| 20 Cartridge | 64 Separation roller |
| 21 Wind-up shaft | 65 Pinch roller |
| 40 Thermal development device | 141 Smooth heating cylinder |
| 41 Heating cylinder | 150 Nip roller |
| 42 Bearing | 241 Heating cylinder |
| 43 Halogen lamp heater | 341 Heating cylinder |
| 44 Path-length correction roller | 441 Heating cylinder |
| 45 Wire | 541 Heating cylinder |

What is claimed is:

1. A thermal development device for heating a thermal development type photosensitive member that is exposed to an image, said thermal development device comprising:

a heating surface comprising at least one of peaks and valleys, curves and linear projections that protrude in a direction that is substantially perpendicular to a direction of travel of the photosensitive member and that are shaped to oppose wrinkling of the photosensitive member.

2. The thermal development device according to claim 1, wherein said peaks and valleys are formed periodically within an image region.

3. A thermal development device for heating a thermal development type photosensitive member that is exposed to an image, said thermal development device comprising:

a heating surface comprising at least one of peaks and valleys, curves and linear projections that protrude in a direction that is substantially perpendicular to a direction of travel of the photosensitive member, wherein said peaks and valleys being smooth within an image forming region and comprise projections on the heating surface on the outside of the image forming region.

4. A thermal development device for heating a thermal development type photosensitive member that is exposed to an image, said thermal development device comprising:

a heating surface comprising at least one of peaks and valleys, curves and linear projections that protrude in a direction that is substantially perpendicular to a direction of travel of the photosensitive member, wherein said curved heating surface comprising a crown shape and said thermal development device further comprising a correction roller having a reverse-crown shape.

5. A thermal development device for heating a thermal development type photosensitive member that is exposed to an image, said thermal development device comprising:

a heating surface comprising at least one of peaks and valleys, curves and linear projections that protrude in a direction that is substantially perpendicular to a direction of travel of the photosensitive member, wherein said projections comprise a spiral shape.

6. The thermal development device according to claim 5, wherein said projections are arranged so that said projections expand in a direction of travel of said photosensitive member.

7. The thermal development device according to claim 5, wherein said heating surface is rotated such that said heating surface has a periphery speed faster than a speed of travel of said photosensitive member.

8. A thermal development device having a heating section that heats by making contact with a part of a thermal development photosensitive member that is exposed to an image, said thermal development device comprising:

photosensitive member engagement means for engaging said photosensitive member between said photosensitive member engagement means and said heating section in a region of an initial heating position, wherein said photosensitive member engagement means comprises an elastic roller, and wherein said photosensitive member engagement means is arranged to exert pressure on said heating section such that a maximum surface pressure is less than 5 kilograms per square centimeter.

9. A thermal development device comprising a heating section that heats by making contact with a part of a thermal development photosensitive member that is exposed to an image, said thermal development device comprising:

photosensitive member engagement means for engaging said photosensitive member between said photosensitive member engagement means and said heating section in a region of an initial heating position in a time-selective manner.

10. The thermal development device according to claim 9, wherein said photosensitive member engagement means is prohibited from engaging said photosensitive member when said photosensitive member is not developing images.

11. The thermal development device according to claim 9, further comprising detection means for detecting a malfunction during an image forming operation, wherein said photosensitive member engagement means is prohibited from engaging said photosensitive member when said detecting means detects the malfunction.

12. A thermal development device having a heating section that heats by making contact with a part of a thermal development photosensitive member that is exposed to an image, said thermal development device comprising:

photosensitive member engagement means constituted by a roller for pressing said photosensitive member against said heating section in a region of an initial heating position; and means for applying tension to said photosensitive member for holding said photosensitive member against said heating section beyond the initial heating position.

13. The thermal development device according to claim 12, wherein said roller is an elastic roller.

14. The thermal development device according to claim 12, wherein said photosensitive member engagement means for engaging said photosensitive member is operated at a relative speed of zero with respect to said heating section.

15. The thermal development device according to claim 12, wherein said roller is a hard roller.

* * * * *